Figure 1:
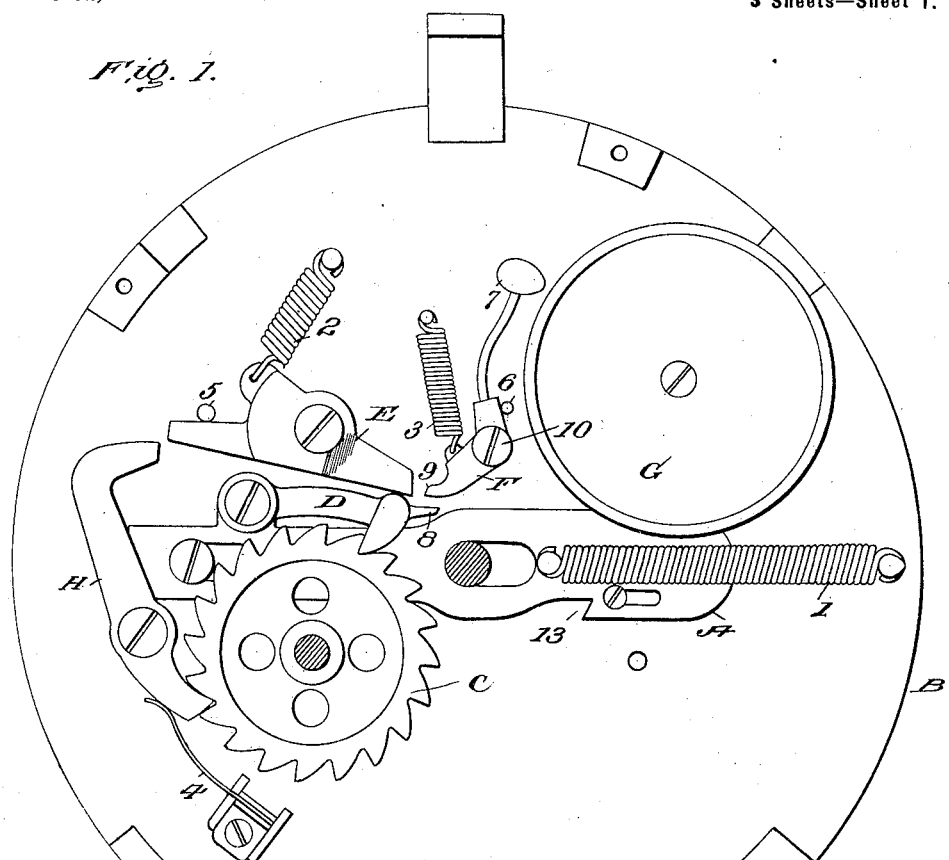

No. 656,935. Patented Aug. 28, 1900.
W. L. BROWNELL.
FARE REGISTER.
(Application filed Nov. 12, 1897.)

(No Model.) 3 Sheets—Sheet 1.

Witnesses

Inventor
Willis L. Brownell
Attorney

No. 656,935. Patented Aug. 28, 1900.
W. L. BROWNELL.
FARE REGISTER.
(Application filed Nov. 12, 1897.)
(No Model.) 3 Sheets—Sheet 2.
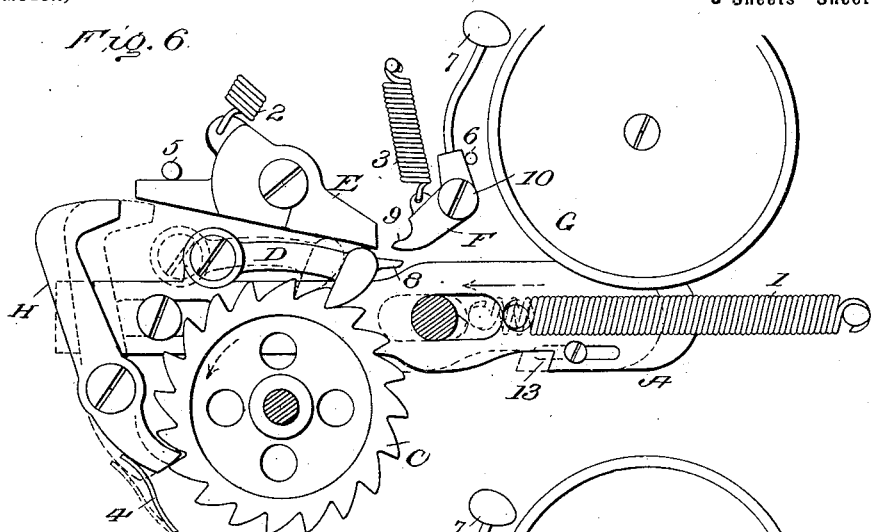
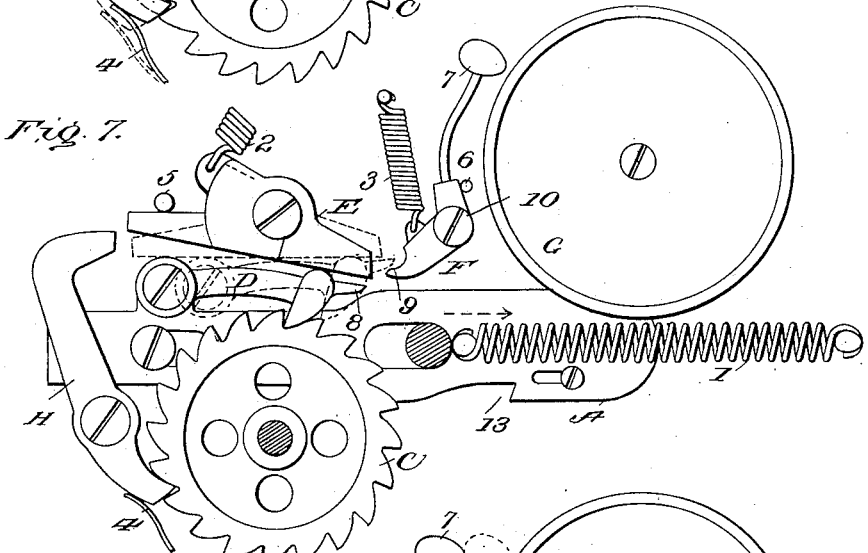
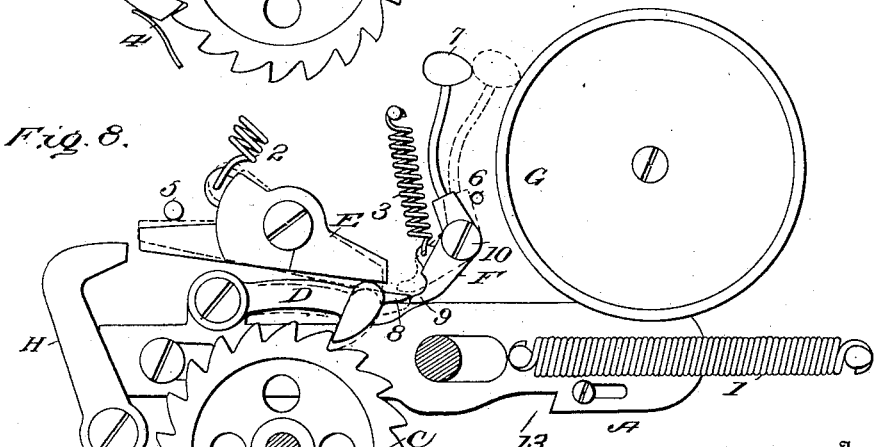

No. 656,935. Patented Aug. 28, 1900.
W. L. BROWNELL.
FARE REGISTER.
(Application filed Nov. 12, 1897.)
(No Model.) 3 Sheets—Sheet 3.
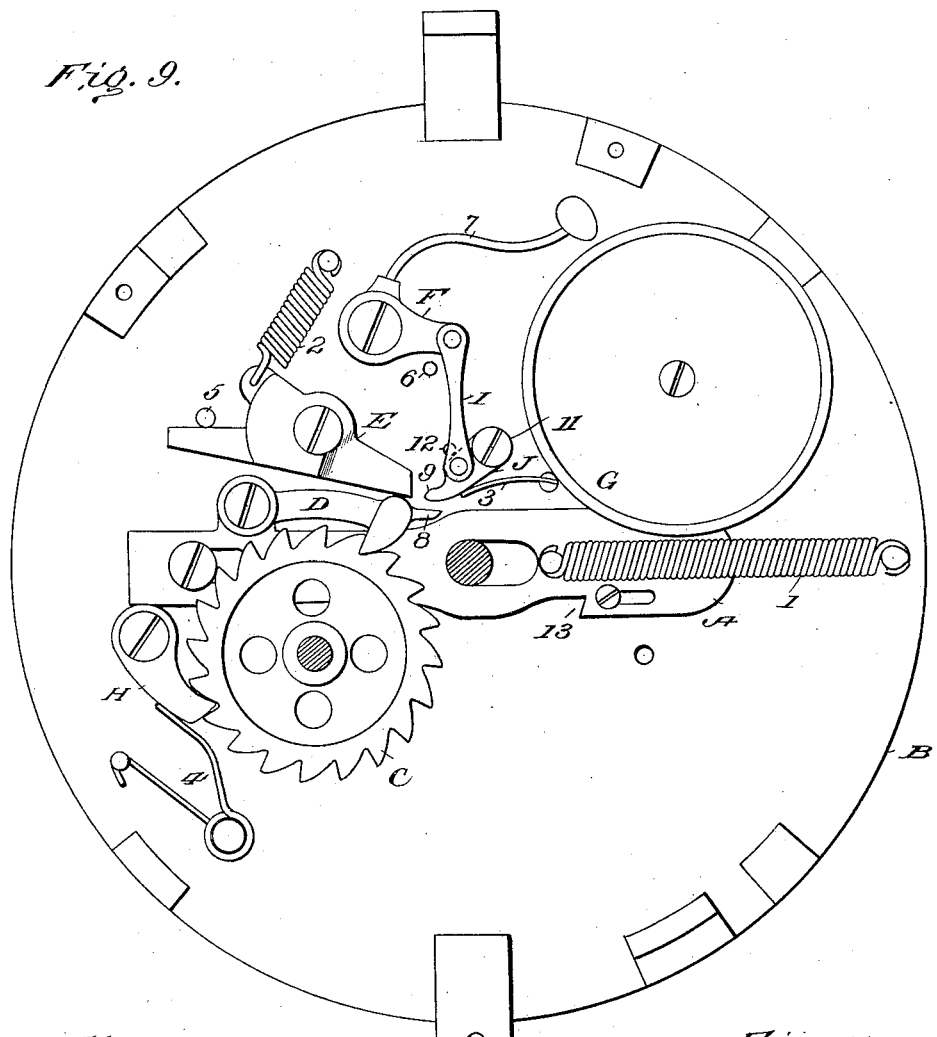
Fig. 9.
Fig. 10.  Fig. 11. 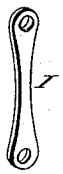

Witnesses
Inventor
Willis L. Brownell
Attorney
THE NORRIS PETERS CO., PHOTO-LITHO., WASHINGTON, D. C.

UNITED STATES PATENT OFFICE.

WILLIS L. BROWNELL, OF ELIZABETH, NEW JERSEY, ASSIGNOR TO THE BROOKLYN AND NEW YORK RAILWAY SUPPLY COMPANY, OF SAME PLACE.

FARE-REGISTER.

SPECIFICATION forming part of Letters Patent No. 656,935, dated August 28, 1900.

Application filed November 12, 1897. Serial No. 658,333. (No model.)

*To all whom it may concern:*

Be it known that I, WILLIS L. BROWNELL, a citizen of the United States of America, and a resident of Elizabeth, Union county, in the State of New Jersey, have invented a new and useful Improvement in Fare-Registers, of which the following is a specification.

This invention relates to what is known as the "Lewis & Fowler" bell mechanism of the fare-registers heretofore manufactured by the owner of the present improvement as regards such bell mechanism under United States Letters Patent No. 190,021, dated April 24, 1877; No. 247,552, dated September 27, 1881, and No. 280,925, dated July 10, 1883. The latest form of that patented bell mechanism is shown and described in Patent No. 506,629, dated October 10, 1893. Its leading characteristic, which is set forth in said Patent No. 190,021 and is retained in the improved mechanism, is that the bell is not rung until after the registration of each fare, which relieves the register from much liability to fraudulent manipulation common to others. Another feature set forth in said Patent No. 247,552 and which is retained in the improved mechanism is a distinct bell-lever having the bell-hammer and striking-spring attached thereto and adapted to remain at rest during the whole of each registering movement of the main slide, thus confining all movement of the bell-hammer to the return movement of said slide. Another part of the same set forth in said Patent No. 247,552 is a swinging catch coacting with said bell-lever to prevent ringing the bell by reversing the movement of the slide after incomplete return movements thereof. This part is now wholly dispensed with. A last part of said bell mechanism shown and described in said Patent No. 506,629 is a "bell-guard," described and claimed in said Patent No. 280,925. This device, which is no longer necessary, but is employed as an accessory, coacts at its respective ends with the main ratchet-wheel and with another moving part and serves in said patented bell mechanism to prevent ringing the bell by allowing the main slide to be suddenly retracted after incomplete registering movements thereof. Notwithstanding all the guards above named if the bell-hammer were set very close to the bell in the factory or by a repairer an expert could occasionally by the process known as "jigging" or jerking the main slide during its return movements cause the bell-hammer to vibrate sufficiently to tap the bell before the final stroke, and thus ring twice for one fare, and a dishonest conductor, discovering this defect in the register, could on every such occasion pilfer five cents or whatever the highest fare might be.

The present invention consists, primarily, in a novel arrangement whereby the bell-hammer is protected against any disturbance whatever until after the return stroke of the pulling-pawl is fully completed, the bell-hammer receiving the necessary impulse to ring the bell while the head of the pawl is in the act of dropping behind a newly-advanced ratchet-tooth preparatory to the next registration, the object and effect being to render it both theoretically and practically impossible to ring the bell more than once for each registration of a fare.

The invention further consists in certain novel combinations of parts whereby the desirable effect above stated is accomplished by the direct coaction of the pulling-pawl with the main ratchet-wheel and bell-lever, and certain desirable features of said patented bell mechanism are retained.

Figure 3:
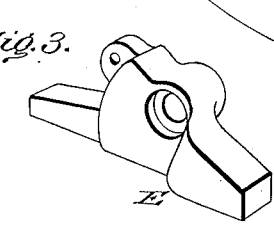
Figure 4:
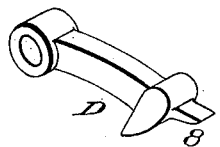
Figure 2:
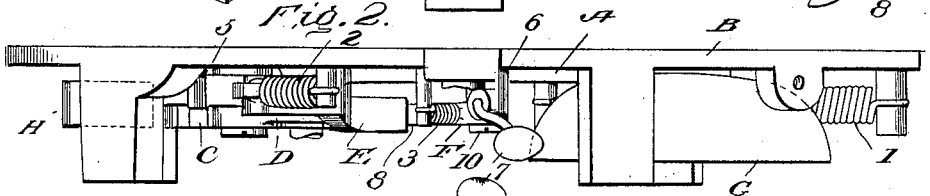
Figure 5:
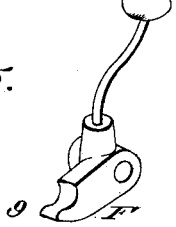
Figure 12:
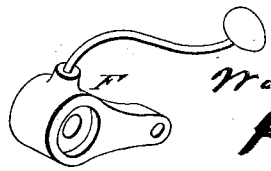

Three sheets of drawings accompany this specification as part thereof. Figure 1 of the drawings is a face view of the works of an improved register, broken away in the plane of the main ratchet-wheel and bell, showing the bell mechanism in elevation. Fig. 2 is a top view of the parts shown in Fig 1. Fig. 3 is a perspective view of what is hereinafter termed the "pawl-lever" detached. Fig. 4 is a like view of the pulling-pawl detached. Fig. 5 is a like view of what is hereinafter termed the "bell-lever" detached. Figs. 6, 7, and 8 are diagrammatic face views, in full and dotted lines, illustrating the operation of the improved bell mechanism, as shown in Figs. 1 to 5, inclusive. Fig. 9 is a view similar to Fig. 1, showing a modified bell mechanism. Fig. 10 is a detached view of what is hereinafter termed the "lower bell-lever"

of the arrangement represented by Fig. 9. Fig. 11 is a like view of the connecting-link shown in Fig. 9, and Fig. 12 is a like view of the bell-lever shown in Fig. 9.

Like letters and numbers refer to like parts in all the figures.

The improved bell mechanism is represented as incorporated in a Lewis & Fowler register, and for clearness the description will be confined to the bell mechanism and those parts of the register directly associated therewith. In both arrangements the improved bell mechanism takes the place of and occupies substantially the same position within the register as the patented bell mechanism hereinbefore referred to. Each of the arrangements includes, as principal parts or accessories of the improved bell mechanism, the main slide A of the register, together with its retracting-spring, hereinafter termed the "mainspring" 1; the cast-iron back plate B, upon the face of which said slide is diametrically guided in a horizontal path and which supports the stretching-post of said mainspring; the main ratchet-wheel C of the register; its pulling-pawl D, pivoted to said slide; a pawl-lever E, with a spring 2 stretched therefrom to a post on the back plate; a distinct bell-lever F, carrying the bell-hammer and having a distinct spring 3; the gong or bell G of the register in the neighborhood of said bell-lever, and, lastly, a detent-pawl H, with its spring 4, to prevent retrogression of the ratchet-wheel and the registering mechanism, which receives its motion from the shaft of this wheel and to adapt the ratchet-wheel to perform its important functions as an element of the bell mechanism. Stops 5 and 6 on the back plate B, coacting, respectively, with the pawl-lever E and the bell-lever F, limit the effective movements of these parts, and the shank of the bell-hammer 7 is adapted to hold the hammer-head normally out of contact with the bell G when the bell-lever is in contact with said stop 6 and to permit it to strike by springing sufficiently when the bell-lever is actuated, as is customary.

It will be noted that in each of the improved mechanisms the bell-lever F is distinct not only from the pulling-pawl D, but from the pawl-lever E, through the medium of which the pulling-pawl D is pressed against the teeth of the ratchet-wheel C and into its successive interdental notches, and instead of being retracted by the mainspring 1 through the medium of said pawl-lever E it is acted on by said spring 2 through said pawl-lever and pawl. In the preferred arrangement represented by Figs. 1 to 8, inclusive, said spring 2 is no longer the striking-spring, but is supplemented by a distinct striking-spring 3, having no other work. The bell-ringing projection 8 on the head of each pulling-pawl has its counterpart in the form of a projection 9 on the adjacent end of the bell-lever F, which extends at a suitable angle toward the pawl from a pivot 10, located only a little way above the main slide A, and the detent-pawl H is preferably and conveniently of the "bell-guard" form heretofore employed and coacts in like manner with the heel of the pawl-lever E as a locking device to prevent the head of the pulling-pawl from rising in contact with the ratchet-wheel after incomplete registering movements of the main slide. When the parts of said preferred mechanism are at rest, as shown in Fig. 1 and in full lines in Fig. 6, said projections 8 and 9 on the pulling-pawl and bell-lever are out of contact with each other and there is no connection between the bell-lever and any movable part, except its own striking-spring 3. During each registering movement of the main slide A the pulling-pawl D turns the ratchet-wheel C one notch, as represented by dotted lines in Fig. 6. The pawl-lever E is left in contact with its stop 5 and is locked in this position by the upper end of the detent-pawl H, and without this there is no possible transmission of any movement whatever to the bell-lever F. When the registering movement is completed, the detent-pawl H is pressed into a fresh interdental notch of the ratchet-wheel C by its spring 4 and the parts appear as in full lines in Fig. 7. During the whole of the return movement of the main slide A, illustrated by this figure, there is likewise no disturbance whatever of the bell-lever F, and the bell cannot therefore be rung or tapped by any amount of jigging. The pawl-lever E is tilted by the head of the pawl D as the latter rises in contact with the contiguous tooth of the locked ratchet-wheel; but said lever E is no longer the bell-lever, and there is no transmission of motion therefrom to the bell-lever F during such return movement. After the return movement of the main slide A is completed and jigging is no longer possible the head of the pulling-pawl D, having passed the extremity of the ratchet-tooth by which it was elevated, is precipitated into the succeeding interdental notch by said spring 2 acting through said pawl-lever E, and during this uncontrollable momentary movement (illustrated by Fig. 8) the coaction of the projections 8 and 9 on the pulling-pawl D and bell-lever F occurs, culminating, as shown in full lines in the figure, in a sufficient retraction of the bell-hammer 7 by the movement of the bell-lever F, followed instantly by the release of said bell-lever, and an effective stroke by the hammer 7 on the bell G, as represented in dotted lines in Fig. 8. A single ring for each registration of a fare without any possibility of its duplication by fraudulent or improper manipulation of the ringing device is thus believed to be insured.

In the modified mechanism represented by Figs. 9 to 12, inclusive, the bell-lever F, with its appurtenances, is located higher above the main slide A and is connected by a link I with a lower bell-lever J, attached to the back plate B by a pivot 11. To this lever J the bell-lever spring 3 is applied as a retracting-spring, holding the lever against a stop 12 on the back plate B. The pulling-pawl D may be identical with the one before described, and its bell-ringing projection 8 contacts with a projection 9 on said lower bell-lever J, preferably like that of said bell-lever F. In this arrangement the spring 2 itself constitutes the striking-spring. A simple detent-pawl is shown at H in Fig. 9 in place of the bell-guard form shown at H in Fig. 1 and Figs. 6 to 8, and a wire spring is shown at 4 in Fig. 9 in place of the blade-spring 4 in Fig. 1, &c. A locking-notch is shown at 13 in both mechanisms to coact with a catch controlled by the resetting mechanism of the register, as heretofore, for preventing the actuation of the main slide A during the setting operation. In further simplifying the mechanism the pawl-lever E may be omitted and the spring 2 applied directly to the pulling-pawl D, as shown in said Patent No. 190,021, and in various other ways. The bell-ringing projection 8 or its counterpart, preferably the latter, may be provided with an antifriction-roller, the shapes of the parts may be largely varied, and other like modifications will suggest themselves to those skilled in the art.

The term "pawl-carrier" is hereinafter used in my claims to include such equivalents of the main slide A as a lever or oscillating wheel carrying one or more pulling-pawls.

Having thus described said improvement, I claim as my invention and desire to patent under this specification—

1. The combination with the bell within a fare-register, of a pawl-carrier, a spring-pressed pulling-pawl moving therewith, a ratchet-wheel rotated step by step by said pawl, means for locking said ratchet-wheel against retrogression, and a distinct bell-lever that remains at rest during the registering movement and the return movement of said pawl-carrier and is acted on by said pawl in the final act of dropping into a fresh interdental notch after such return movement is fully completed.

2. The combination with a ratchet-wheel, within a register, of a spring-pressed pulling-pawl and a spring-pressed detent-pawl in mesh with said wheel, and a distinct and normally-stationary bell-lever carrying the bell-hammer and acted on by said pawl to retract said hammer after the registering and return movements of said pawl-carrier are both completed and in the final act of dropping into a fresh interdental notch, and a distinct striking-spring acting on said bell-lever.

3. The combination, in a register, of a ratchet-wheel and means for locking it against retrogression after each registering movement, means for turning said wheel step by step including a spring-pressed pulling-pawl constructed with a bell-ringing projection, a distinct and normally-stationary bell-lever acted on by said projection as the pawl drops into a fresh interdental notch, and a striking-spring acting on said bell-lever.

4. The combination, in a register, of a ratchet-wheel and means for locking it against retrogression after each registering movement, a pulling-pawl, means for pressing the head of said pawl against the ratchet-teeth and into the successive interdental notches, and a distinct bell-lever acted on by said pulling-pawl during the act of pressing said head into a fresh interdental notch after the registering and return movements are both completed.

5. The combination, in a register, of a ratchet-wheel and means for locking it against retrogression after each registering movement, a pulling-pawl, a pawl-pressing spring, a pawl-lever transmitting pressure from said spring to the head of said pawl, and a distinct bell-lever acted on by said pulling-pawl during the act of pressing said head into a fresh interdental notch of said ratchet-wheel.

6. The combination, in a register, of a ratchet-wheel and means for locking said wheel against retrogression, a "bell-guard" detent-pawl, a pulling-pawl, a pawl-pressing spring, a pawl-lever transmitting pressure from said spring to the head of said pulling-pawl and locked by the upper end of said detent-pawl, and a distinct bell-lever actuated by said pulling-pawl in its act of dropping into a fresh interdental notch in said ratchet-wheel.

WILLIS L. BROWNELL.

Witnesses:
W. B. HUGHES,
A. M. BROWNELL.